United States Patent [19]
Georgiou et al.

[11] Patent Number: 5,798,918
[45] Date of Patent: Aug. 25, 1998

[54] PERFORMANCE-TEMPERATURE OPTIMIZATION BY MODULATING THE SWITCHING FACTOR OF A CIRCUIT

[75] Inventors: Christos John Georgiou, White Plains; Edward Scott Kirkpatrick, Croton-on-Hudson; Thor Arne Larsen, Hopewell Junction, all of N.Y.

[73] Assignee: International Business Machines Corporation, Armonk, N.Y.

[21] Appl. No.: 639,396

[22] Filed: Apr. 29, 1996

[51] Int. Cl.$^6$ ............................................. G05B 13/02
[52] U.S. Cl. ..................... 364/148; 364/146; 364/150; 364/152; 364/154
[58] Field of Search ................... 364/557, 148, 364/168, 146, 150, 152, 154, 179; 307/116, 117; 395/550, 555, 557; 377/20

[56] References Cited

U.S. PATENT DOCUMENTS

| | | | |
|---|---|---|---|
| 4,870,497 | 9/1989 | Broadwater et al. | 340/598 |
| 5,021,679 | 6/1991 | Fairbanks et al. | 307/66 |
| 5,073,838 | 12/1991 | Ames | 361/103 |
| 5,162,668 | 11/1992 | Chen et al. | 307/296.8 |
| 5,189,314 | 2/1993 | Georgiou et al. | 307/271 |
| 5,300,836 | 4/1994 | Cha | 307/491 |
| 5,336,939 | 8/1994 | Eitrheim et al. | 307/269 |
| 5,359,232 | 10/1994 | Eitrheim et al. | 307/268 |
| 5,359,234 | 10/1994 | Atriss et al. | 307/310 |
| 5,359,727 | 10/1994 | Kurita et al. | 395/550 |
| 5,367,638 | 11/1994 | Niessen et al. | 395/250 |
| 5,422,806 | 6/1995 | Chen et al. | 364/149 |
| 5,451,892 | 9/1995 | Bailey | 327/113 |

(List continued on next page.)

FOREIGN PATENT DOCUMENTS

| | | |
|---|---|---|
| 0 549 052 A2 | 12/1992 | European Pat. Off. . |
| 0 549 052 B1 | 12/1992 | European Pat. Off. . |
| 0 631 220 A2 | 5/1994 | European Pat. Off. . |

OTHER PUBLICATIONS

C. K. Moore, "Power Management Sleep–Mode Control for Microprocessors", IBM Technical Disclosure Bulletin, vol. 36, No. 8, pp. 189–190, Aug. 1993.

S. R. Boyle et al., "A CMOS Circuit for Real-Time Chip Temperature Measurement", IEEE, 1063–6390/94, pp. 286–291, 1994.

(List continued on next page.)

*Primary Examiner*—Thomas C. Lee
*Assistant Examiner*—Ramesh Patel
*Attorney, Agent, or Firm*—Kevin M. Jordan

[57] ABSTRACT

A system and method for modulating the switching factor of a circuit to control heating and which does not require modulation of the circuit's clock frequency. The switching factor refers to the fact that due to gating requirements, latency and data transfer characteristics, the rate at which a circuit's inputs are addressed is some fraction of the circuit clock frequency. Application can be made to many existing systems which incorporate single or multiple VLSI circuits such as superscalar microprocessors, parallel processors, DSPs, microcontrollers and MPEG decoders. A method for controlling a switching factor of a multi-functional unit processor includes the steps of: scheduling instructions stored in a memory for execution on each functional unit; generating a first temperature signal for a first functional unit and a second temperature signal for a second functional unit, each temperature signal being a function of a temperature associated with each functional unit; identifying the first functional unit and the second functional unit associated with each temperature signal, responsive to the generating step; comparing the first temperature signal with a first predetermined temperature threshold signal; generating a first temperature delay signal when the first temperature signal exceeds the first predetermined threshold, responsive to the comparison; and reducing the switching factor of the first functional unit according to the first temperature delay signal by delaying scheduling instructions for execution on the first functional unit. Further reduction in power dissipation may be achieved by using thermal feedback to cooperatively vary the voltage and frequency of a circuit.

33 Claims, 6 Drawing Sheets

U.S. PATENT DOCUMENTS

| | | | |
|---|---|---|---|
| 5,453,705 | 9/1995 | Atallah et al. | 326/86 |
| 5,465,373 | 11/1995 | Kahle et al. | 395/800 |
| 5,490,059 | 2/1996 | Mahalingaiah et al. | 364/166 |
| 5,502,838 | 3/1996 | Kikinis | 395/550 |
| 5,557,550 | 9/1996 | Vigil et al. | 364/557 |
| 5,563,928 | 10/1996 | Rostoker et al. | 377/20 |
| 5,572,719 | 11/1996 | Biestfeldt | 395/555 |
| 5,608,687 | 3/1997 | Komearek et al. | 365/233.5 |
| 5,610,453 | 3/1997 | Smith | 307/116 |

OTHER PUBLICATIONS

S. Mutoh et al., "1–V Power Supply High–Speed Digital Circuit Technology with Multithreshold–Voltage CMOS", IEEE Journal of Solid–State Circuits, vol. 30, No. 8, pp. 847–854, Aug. 1995.

K. Shimohigashi et al., "Low–Voltage ULSI Design", IEEE Journal of Solid–State Circuits, vol. 28, No. 4, pp. 408–413, Apr. 1993.

L. S. Nielsen et al., "Low–Power Operation Using Self–Timed Circuits and Adaptive Scaling of the Supply Voltage", IEEE Transactions on Very Large Scale Integration (VLSI) Systems, vol. 2, No. 4, pp. 391–397, Dec. 1994.

P. Macken et al., Session 15. Innovative Circuit Design, FPM 15.2: "A Voltage Reduction Techinque for Digital Systems", 1990 IEEE International Solid–State Circuits Conference Digest of Technical Papers, First Edition, pp. 238–239, Feb. 16, 1990.

M. Izumikawa et al., "WP 5.4 A 0.9V 100 MHz 4mW 2 mm$^2$ 16b DSP Core", Digest of Technical Papers, 1995 IEEE International Solid–State Circuits Conference, pp. 84–85, 1995.

PERFORMANCE-TEMPERATURE OPTIMIZATION BY MODULATING THE SWITCHING FACTOR OF A CIRCUIT

CROSS-REFERENCE TO RELATED APPLICATIONS

The present invention is related to U.S. patent application Ser. No. 08/639,586 entitled "Performance-Temperature Optimization by Cooperatively Varying the Voltage and Frequency of a Circuit", filed of even date herewith by the inventors hereof and assigned to the same assignee herein, and incorporated herein by reference in its entirety.

FIELD OF THE INVENTION

This invention relates in general to an improved data processing system and in particular to a system and method for modulating the switching factor of a circuit to control heating. Still more particularly, the invention relates to a system and method for modulating the switching factor of a circuit such as a functional unit in a single or multi-functional unit processor to control heating.

BACKGROUND

Multi-functional unit processing offers well known parallel processing advantages. Unfortunately, the increased power dissipation imposed on the single substrate and package is a serious limitation.

Excessive temperatures at semiconductor device junctions can cause device and/or circuit malfunctions/failures, reduce circuit performance, and cause circuit interconnect and/or package failure. Increases in temperature tend to increase a signal's propagation delay through a circuit which is typically characterized by a critical timing path. Changes in propagation delays can cause undesired transients and/or synchronization problems, especially in the case of critical timing paths in CMOS and similar circuits.

One approach to reducing the power dissipation of a circuit is to reduce the voltage swing at its outputs. CMOS and similar circuits will function correctly over a significant range of supply voltage. Reducing the supply voltage will cause the propagation of a signal through a critical timing path to slow until a malfunction occurs.

Generally, in CMOS VLSI circuits, most of the power dissipated is a result of the energy required to charge and discharge the load and internal capacitances on any internal and external circuits. One approach to controlling power dissipation uses temperature feedback to control the clock frequency of the circuit. The frequency-based approach reduces the power dissipated by the clock circuit itself and for circuits during the fraction of cycles that the circuits are addressed, i.e., their duty cycle.

The particular temperature feedback mechanisms used in the frequency-based approach vary. The temperature feedback mechanism could be on-chip, or mounted in close proximity to a potentially hot chip, usually by means of a thermocouple on the package or case. Another frequency-based approach does not use direct temperature feedback. Instead, a piecewise estimate of temperature change is determined as a function of time and clock frequency including temperature limits. A measured operating frequency and elapsed time is correlated to the piecewise estimate and the operating frequency is throttled between the temperature limits.

Regardless of the particular feedback mechanism used, one concern that arises in any frequency-based approach is that varying the clock frequencies to different portions of a chip may cause synchronization problems. In addition, the frequency-based approach is optimal only for the subset of clock cycles when a given circuit's inputs are addressed. Thus, there is need for an improved method and system for controlling the power dissipation of a circuit which maintains synchronization and reliability. The present invention addresses such a need.

SUMMARY

The present invention is directed to a system and method for modulating the switching factor of a circuit to control heating. Modulation of the circuit's clock frequency is not required and thus potential synchronization issues are advantageously avoided. The switching factor (also called duty cycle) of a circuit is the fraction of clock cycles that an input of the circuit is addressed and hence when most of its power is dissipated as heat (due to the charging and discharging of the load and internal capacitances on any internal and external circuits).

A method for modulating the switching factor of a circuit to control heating having features of the present invention comprises the steps of: generating a temperature signal which is a function of a temperature associated with the circuit; comparing the temperature signal with a predetermined temperature threshold signal; and varying the switching factor of the circuit, responsive to said step of comparing.

Another embodiment of the present invention is directed to a system and method for modulating the switching factor of a circuit such as a functional unit in a superscalar or parallel processor to control heating. A method for modulating the switching factor of the functional unit to control heating having features of the present invention comprises the steps of: scheduling instructions stored in a memory for execution on each functional unit; generating a first temperature signal for a first functional unit and a second temperature signal for a second functional unit, each temperature signal being a function of a temperature associated with each functional unit; identifying the first functional unit and the second functional unit associated with each temperature signal, responsive to the generating step; comparing the first temperature signal with a first predetermined temperature threshold signal; generating a first temperature delay signal when the first temperature signal exceeds the first predetermined threshold, responsive to the comparing step; and reducing the switching factor of the first functional unit according to the first temperature delay signal by delaying scheduling instructions for execution on the first functional unit.

Still another embodiment uses the thermal feedback to additionally cooperatively vary the voltage and frequency applied to an overheating circuit.

BRIEF DESCRIPTION OF THE DRAWINGS:

These and other improvements are set forth in the following detailed description. For a better understanding of the invention with advantages and features, refer to the description and to the drawings wherein:

FIG. 4c depicts a logic flow chart which illustrates a modification of step 420 for cooperatively varying the voltage and frequency of a functional unit in accordance with the system shown in FIG. 4a.

DETAILED DESCRIPTION

The present invention relates to a system and method for modulating the switching factor (or duty cycle) of a circuit to control heating. The switching factor as described herein refers to the fact that due to gating requirements, latency and data transfer characteristics, the rate at which a circuit's inputs are addressed is some factor (or fraction) of the circuit clock frequency. Thus, the power dissipation of a CMOS VLSI circuit can be stated as $(\tfrac{1}{2})*f*S*C*V^2$ where: f is the clock frequency; V is the voltage swing; C is the total capacitance; and S is the switching factor (or duty cycle). It is assumed that the circuit's inputs are addressed every 1/S clock cycles and that the total chip capacitance C, subject to switching, is constant.

The present invention can be advantageously applied to many existing data processing systems which incorporate single or multiple VLSI circuits which perform a particular function (also called functional units). Examples of well known functional units are: fixed-point units, floating point units, load/store units, and branch units found in typical general purpose and superscalar microprocessors, closely-coupled or distributed parallel processors, single or parallel digital signal processors (DSPs), or specialized processors such as microcontrollers and MPEG decoders.

Figure 1A:
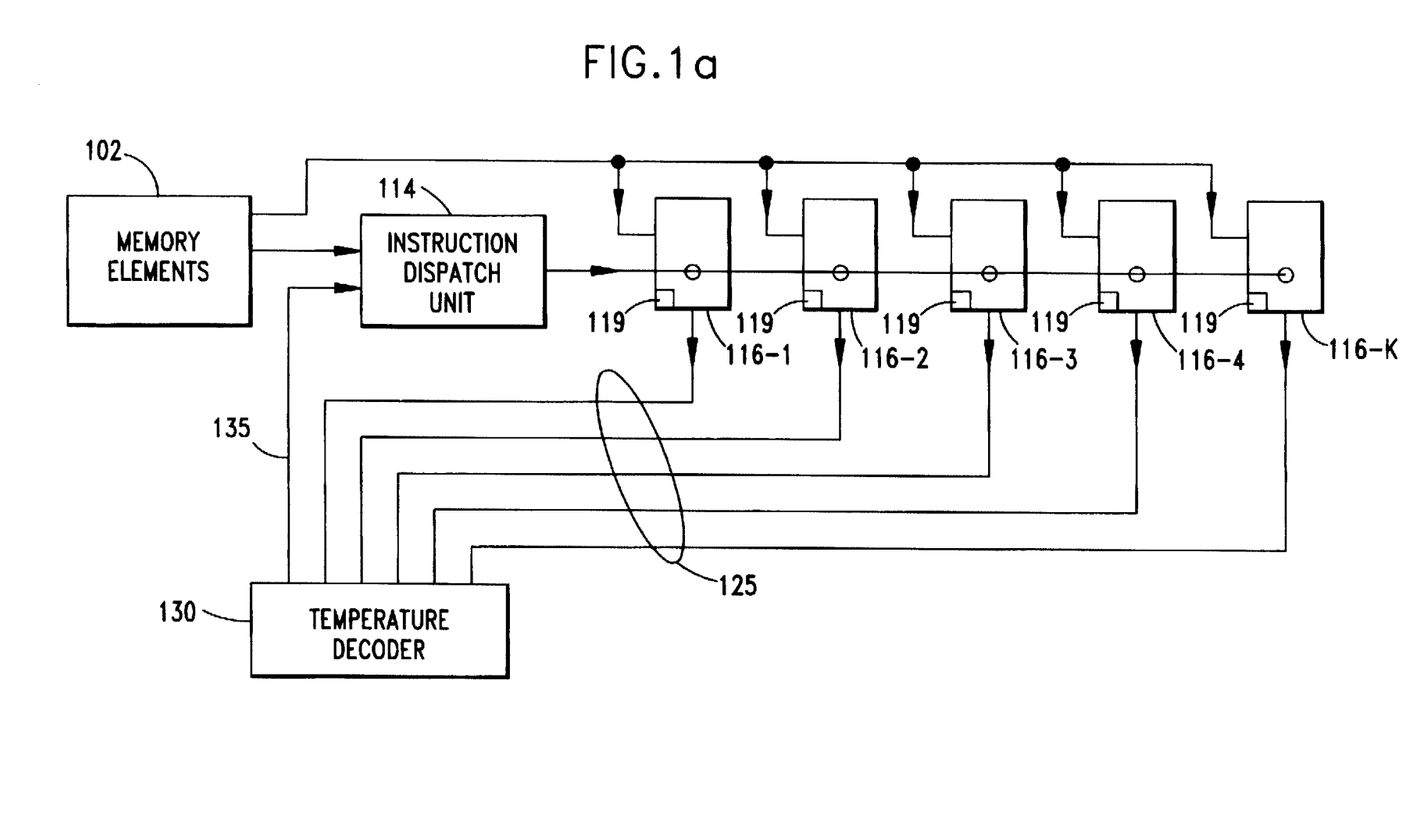
FIG. 1a shows schematically an overview of a functional block diagram of a computer processing system that embodies the present invention.

With reference now to the figures and in particular to FIG. 1a, there is depicted a high level block diagram of an application of the present invention to control heating in a superscalar microprocessor architecture. Superscalar architectures are well known in the art. See, e.g., M. Johnson, "Superscalar Microprocessor Design," Prentice Hall (1991). An exemplary superscalar microprocessor is that sold by the IBM Corporation under the trademark "POWERPC." As is typical in superscalar architectures, a dispatch unit 114 (also called a scheduler or instruction dispatcher) is used to schedule instructions stored in memory elements 102 for execution on functional units 116-1 ... 116-K. Such dispatch units are well known in the art. See, e.g., U.S. Pat. No. 5,465,373, issued Nov. 7, 1995, by Kahle et al., entitled "Method and System for Single Cycle Dispatch of Multiple instructions in a Superscalar Processor System," which is herein incorporated by reference in its entirety.

The dispatch unit 114 examines the instructions for dependencies prior to scheduling the instructions for execution, one to each functional unit. The use of such dependencies is also well known in the art. See, e.g., U.S. patent application Ser. No. 377,813, filed Jan. 25, 1995, by Vadem et al., entitled Distributed Completion Control in a Microprocessor, which is hereby incorporated by reference in its entirety. It is only during those fraction of clock cycles (1/S) that the dispatch unit 114 schedules an instruction for execution on a functional unit 116-1 ... 116-K that the functional unit's inputs are addressed and the functional unit dissipates most of its power.

Preferably each functional unit has an on-chip thermal sensor 119 which generates an electrical signal 125 representative of the temperature of the associated functional unit. The signal 125 from the thermal sensor 119 is provided to a temperature decoder 130 which may include control logic for periodically sampling, decoding, and comparing the signal 125 to a predetermined threshold. As a result of the comparison, the temperature decoder 130 generates a signal 135 representing a new dependency to the dispatch of instructions by the dispatch unit 114. In short, if feedback from a thermal sensor 119 and decoder 130 indicates that a functional unit may overheat, the dispatch unit 114 is advantageously adapted to reduce the instruction dispatch rate (the switching factor) to that functional unit. Thermal feedback to the dispatch unit 114 continues and if the functional unit cools to acceptable levels, the dispatch unit may increase the rate at which instructions are scheduled (the switching factor) on the functional unit.

As is typical, the functional units may include a floating point unit, multiple load/store and fixed point units, and a branch execution unit. Here, incoming instructions may be scheduled on an available equivalent functional unit for processing without any reduction in throughput. Note, that the power dissipation is efficiently and directly reduced for the fraction of cycles that the functional unit's inputs are addressed. If an alternate functional unit is not available, the time to process a fixed size data task may increase. More importantly however, the total switching factor S is reduced, which translates into a lower temperature, in particular, in the chip partition containing the overheating processor(s). These advantages have been achieved without requiring direct modulation of the system or functional units clocks. Thus, the need for clock regulation circuitry is avoided as well as any attendant synchronization problems. Those skilled in the art will appreciate however, that system or functional unit clock modulation may be used as a supplement to the present invention.

Many thermal sensors may be used because future complex VLSI/ULSI chips could have significant temperature gradients across a chip. Thus, a sensor may be associated with each independently controllable functional unit, which may be thousands to millions of logical gates. The thermal sensors may implemented on-chip along with their control logic and a highlevel feedback mechanism to redirect work or slow the instruction dispatch rate to prevent overheating. Using multiple sensors which are tightly coupled to the functional units they control provides a higher unit performance without jeopardizing the accuracy or reliability of the whole chip. This arrangement optimizes the compromise between cost and performance. It will also admit control settings for lower overall power consumption while allowing high performance locally.

Figure 1B:
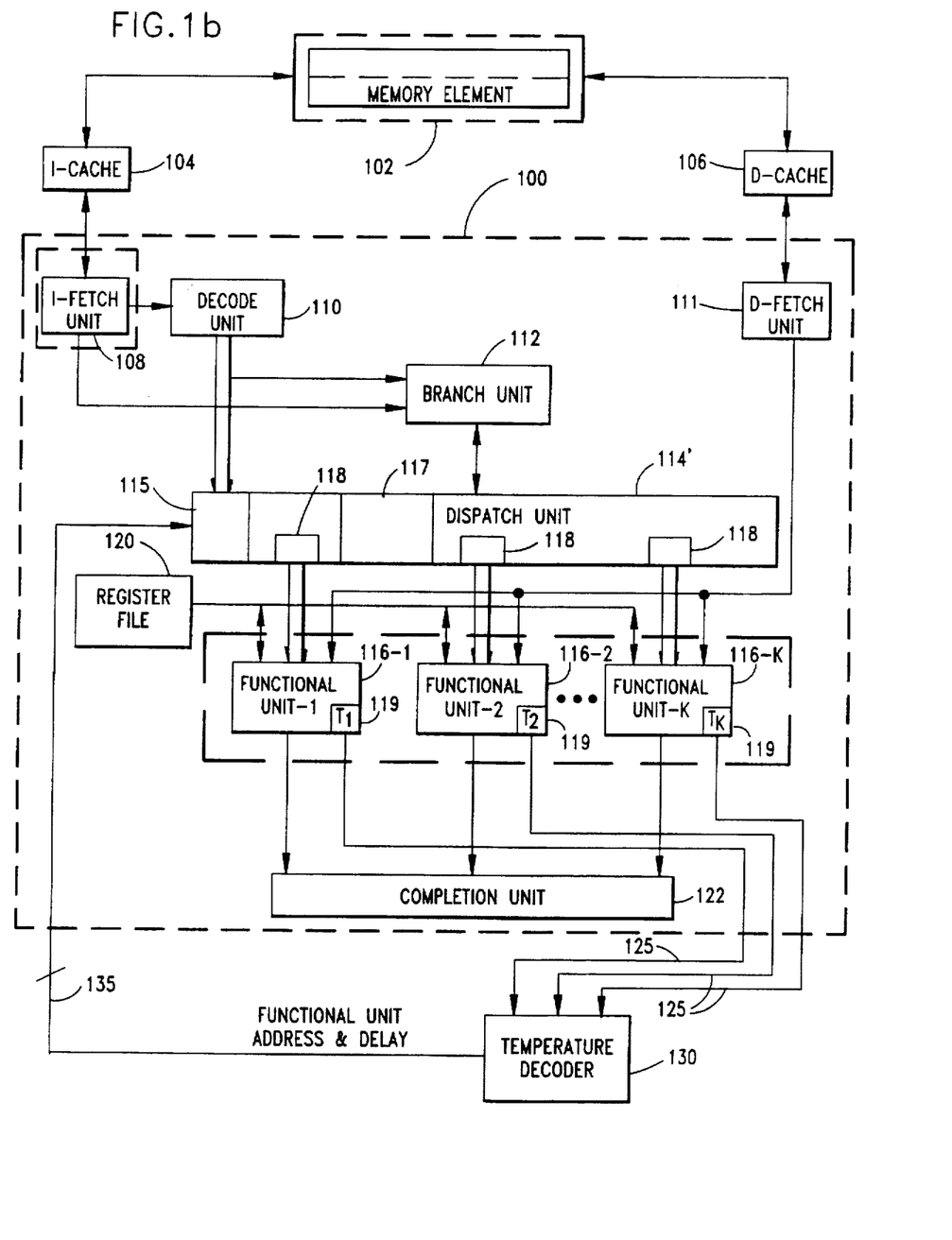
FIG. 1b shows schematically a more detailed functional block diagram of a computer processing system that embodies the present invention.

Referring now to FIG. 1b, a more detailed functional block diagram of a computer processing system having features of the present invention is shown. The computer processing system includes a processor unit 100 and an associated memory unit 102. The memory unit 102 holds program data and/or instructions to be executed on the processor unit 100. As is conventional, the memory unit 102 is interfaced with an instruction cache unit 104 and a data cache unit 106 to hold frequently used respective instruction and data portions of the memory unit 102. Alternatively, the instruction cache unit 104 and data cache unit 106 may be merged into a single unified cache. The instruction cache 104 and/or data cache units 106 may also comprise multiple caches or multilevel caches, as is also well known. Typically, the instructions/data stored in the instruction cache 104 and data cache 106, respectively, is divided into lines or blocks.

An instruction fetch unit 108 is used to fetch one or more blocks of instructions stored in the instruction cache 104 into a decode unit 110. The decode unit 110 forwards the branch and condition register update instructions to a branch unit 112 for execution and forwards sequential (non-branch instructions) to a dispatch unit 114. The dispatch unit 114 (described in more detail below) analyses dependencies among pending instructions, and schedules execution of the instructions, one on each of functional units 116-1 through 116-K.

A D-Fetch unit 118 handles fetching of blocks of data from the data cache 106 into the functional units 116 as needed. The data cache unit 106 holds data values used as source operands by the instructions and some data values generated by executed instructions. Since multiple memory-resident data values may be simultaneously required by the functional units 116 and multiple memory-bound results may be simultaneously generated, the data cache unit 106 is typically multi-ported. The processing unit 100 also includes a register file 120 containing a set of registers. The register file 120 provides operands to the functional units 116 for executing instructions and receives results of execution. This set is further broken down into architecturally visible set of registers and architecturally invisible registers. Architecturally visible, or architected registers, refer to the fixed set of registers that are accessible to the assembly level programmer (or the compiler) of the machine. Such a register file 120 is well known in the art.

Each functional unit 116 can execute some or all types of instructions. The functional units 116 receive input source operands from and writes the output results to the register file 120 and/or the data cache unit 106. For ease of explanation, it is assumed that each of the functional units 116-1 ... 116-K can execute any instruction. Alternatively, the functional units may be asymmetric, i.e., a specific functional unit can only execute a subset of instructions. Here, the dispatch unit 114 must be aware of this asymmetry and schedule the instructions appropriately.

The processor unit 100 also includes a completion unit 122 which is responsible for completing instruction execution in an order considered valid by the architecture. Although the functional units 116 may execute instructions out-of-order, the processor unit 100 may or may not be allowed to complete the instructions in the same order, depending on the architectural constraints. The branch unit 112 predicts unresolved branches, and determines the validity of each prediction on branch resolution. Branch unit 112 may also include a condition register for evaluating the outcome of conditional branches, and logic that updates the condition register according to the results of operations performed by the functional units 116.

As is conventional, the dispatch unit 114 includes an instruction buffer 115 for storing the decoded instructions forwarded from the decode unit 110. Instructions in the buffer 115 are typically analyzed for dependencies by the dispatch unit 114 and forwarded to the scheduler 117 which is also well known in the art for superscalar machines. All instructions received by the scheduler 117 in the same cycle may be assumed to be independent. The scheduler 117 schedules the instructions for execution on an appropriate functional unit 116-1 through 116-K when all dependencies are met. Exemplary dependencies may be: a functional unit's busy status; whether destination registers are available; whether the instruction is valid; whether completion unit 122 buffers are available; and whether there are any resource conflicts. When all dependencies are resolved, the scheduler 117 may latch the instructions into reservation stations 118 or execution input latches at the inputs of the selected functional unit 116-1 through 116-K. Reservation stations are well known in the art, see, e.g., M. Johnson, Superscalar Microprocessor Design, Prentice Hall (1991) (pp 45–48, pp. 127–146). Reservation stations are also used in the microprocessor sold by the Intel Corporation under the trademark "Pentium." Those skilled in the art will appreciate that although only a single dispatch unit 114 and scheduler 117 is shown in this embodiment, multiple schedulers and/or dispatch units could be used within the spirit and scope of the present invention.

Each functional unit 116-1 through 116-k may include an on-chip thermal sensor 119 mechanism. The thermal sensor 119 may comprise a current-controlled CMOS ring oscillator which sends out a square wave signal whose frequency is an inverse function of temperature. See, e.g., S. Boyle, R. Heald, "A CMOS Circuit for Real-Time Chip Temperature Measurement," PROCEEDINGS of COMPCON '94, San Francisco, Calif., March., 1994, pp. 286–291; which is hereby incorporated by reference in its entirety. The thermal sensor 119 output may be sequentially sampled by temperature decoder 130 (described in FIG. 2) via signal paths 125. The decoder 130 decodes and compares the thermal sensor output with a predetermined threshold and outputs a delay value and functional unit address on data path 135. Thus, the decoder output is coupled to the dispatch unit 114 to provide a new dependency parameter for controlling heat by modulating the dispatch rate (switching factor) to a respective functional unit (as will be described later with reference to FIG. 3). The dispatch unit 114 schedules instructions for execution on functional units 116-1 through 116-K as a function of the delay value.

A variety of alternative on-chip thermal sensors are well known in the art. A typical thermal sensor measures the forward voltage of a temperature-characterized on-chip diode. Many thermal sensors capable of generating either digital or analog signals may be used as the thermal sensor 119 mechanism of the present invention to achieve substantially the same results. All such variations are included within the spirit and scope of the present invention.

Figure 2:
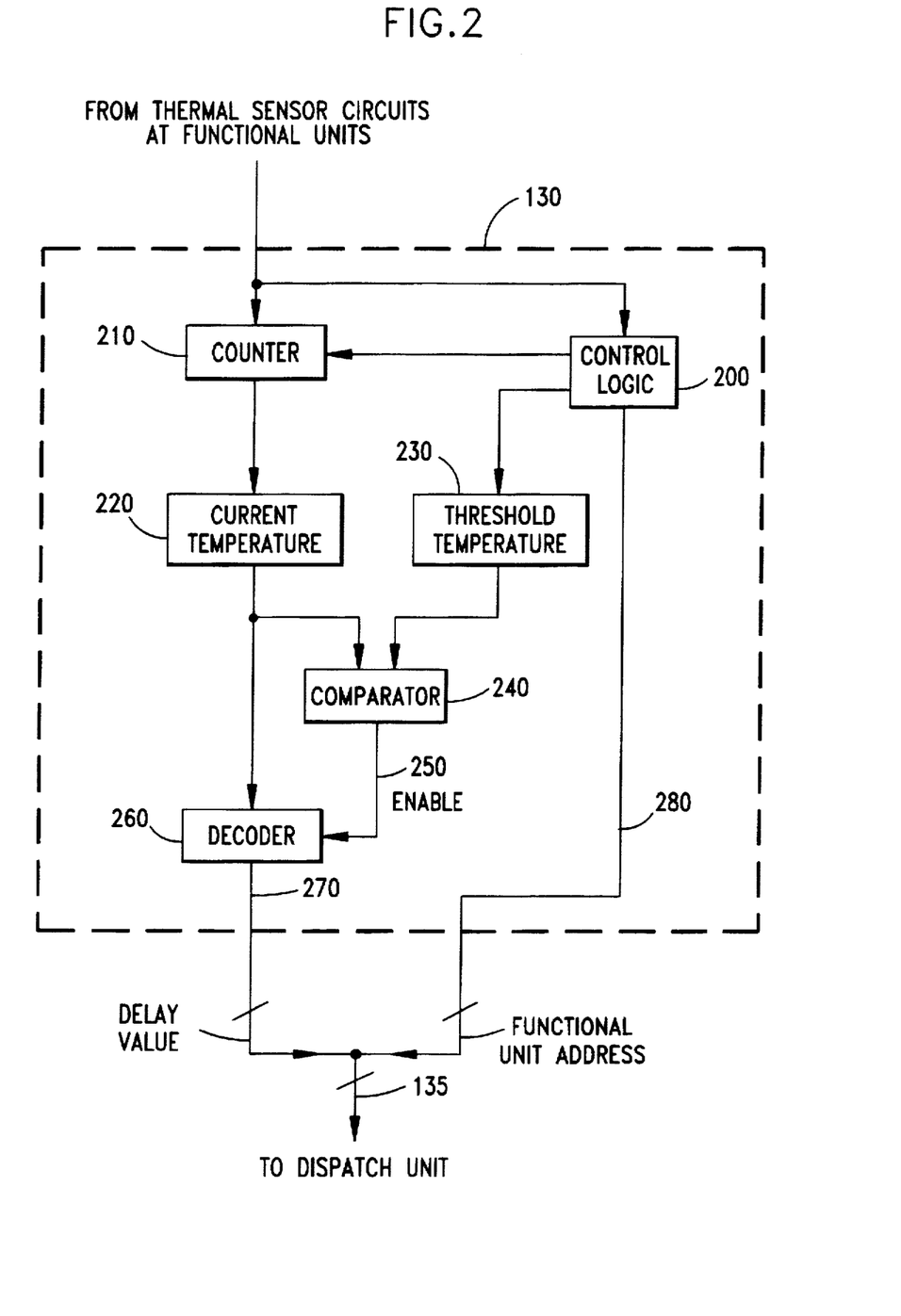
FIG. 2 shows an embodiment of the temperature decoder block of FIG. 1 in more detail.

FIG. 2 illustrates an example of the temperature decoder 130. Control logic 200 may periodically and sequentially select or latch a feedback path 125 to one of the thermal sensors 119 thus coupling the ring oscillator frequency of the associated sensor 119 to counter 210. Here, the ring oscillator frequency is inversely proportional to temperature. The sampling can be done sequentially or in parallel within the scope of the present invention. Knowing the nature of each functional unit, chip layout, and associated data, one skilled in the art could further modify the control logic 200 to control the method and rate of sampling as a function thereof. Counter 210 translates the sampled frequency into a digital signal 220 representing the current operating temperature of the sampled functional unit. Temperature decoder 130 may include logic which complements the count obtained by counter 210 to produce a count which is directly proportional to the sensed temperature. Control logic 200 simultaneously outputs a predetermined digital signal 230 representing the threshold temperature for the sampled functional unit. The predetermined digital signal 230 value could be hardwired into the temperature decoder or stored and accessed in a register such as register file 120 by means well known in the art. Both digital signals 220 and 230 may be fed into a comparator 240 which outputs an enable signal 250 to decoder 260 when the signal 220 exceeds threshold temperature 230. Upon receiving enable signal 250, decoder 260 converts signal 220 to a delay signal 270 representing a delay count to be sent to dispatch unit 114. Alternatively, decoder 260 could be a latch which latches an appropriate value contained in counter 210 without decoding. The control logic 200 also outputs an associated functional unit address 280 for the sampled functional unit along with delay signal 270. The delay signal 270 and address 280 are coupled to dispatch unit 114 via data path 135. Those skilled in the art will also appreciate that an analog-to-digital converter could be added to the input of counter 210 to accommodate a thermal sensor which generates an analog output.

Figure 3:
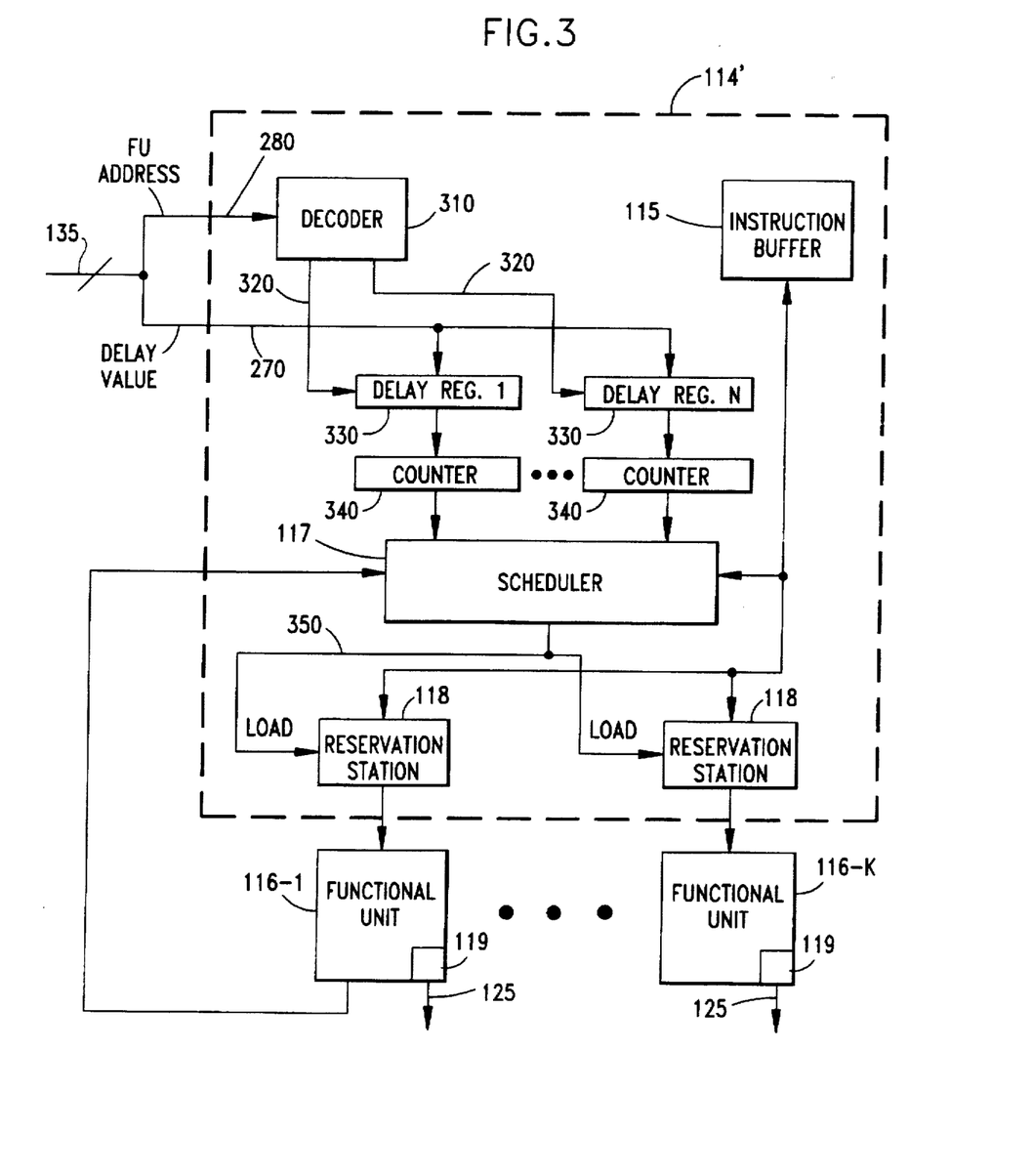
FIG. 3 shows an embodiment of the dispatch unit block of FIG. 1 in more detail.

FIG. 3 illustrates an example of a dispatch unit 114'. The dispatch unit 114' includes a scheduler 117 adapted to use the new dependency parameter, i.e., the delay signal 270 to control the rate (switching factor) at which instructions are executed, one on each of functional units 116-1 ... 116-K. As discussed above, it is assumed that temperature decoder 130 has output both a delay signal 270, e.g., some non-zero value, and a functional unit address 280 on data path 135 representing an overheating functional unit. The functional unit address 280 is coupled to decoder 310 which decodes the address 280 and outputs a delay register enable signal 320 which loads delay signal 270 into a delay register 330 associated with the overheating functional unit. The delay signal is then loaded into a counter 340 which counts down (or up) to a predetermined value, e.g., a zero value. The output of counter 340 is coupled to scheduler 117 which has been adapted to latch instructions contained in the instruction buffer 115 into reservation stations 118 as a function of a new temperature dependency according to the present invention represented by the value loaded into counter 340. For example, scheduler 117 may be adapted by means well known in the art to output load signal 350 to latch an instruction contained in instruction buffer 115 into reservation station 118 for an otherwise ready functional unit only if the predetermined value is contained in the counter 340 associated therewith. Thus, the switching factor, i.e., the fraction of clock cycles during which the functional unit's inputs are addressed (and dissipate most of its power) is modulated to control the power dissipated. The temperature control has been advantageously accomplished without requiring manipulation of the clock frequency although neither is it precluded.

In the event another functional unit is unavailable to execute the instruction, the overheating functional units may operate at a reduced instruction dispatch rate. Alternatively, the instruction may be latched into a reservation station associated with another equivalent functional unit for execution with minimal loss of throughput. More importantly, in either case, the total switching factor S is reduced, which advantageously translates into a lower temperature, in particular, in the affected chip partition. The processor 100 preferably incorporates well known dynamic power management techniques so that instructions already latched into a reservation station 118 will complete despite the fact that no additional instructions are loaded. Those skilled in the art will appreciate that the present invention does not preclude increasing either the system clock frequency or the clock frequency to any remaining non-overheating functional units to optimize overall throughput.

Referring again to FIG. 2, the temperature decoder 130 may continue periodically sampling the functional units 116-1 through 116-K. The sampling rate may be several orders of magnitude slower than the clock frequency. As long as the sampled temperature exceeds the predetermined threshold temperature 230, the dispatch unit 114' will modulate the switching factor S (or instruction dispatch rate) to control the heat generated by the associated functional unit. If the temperature continues to increase, the delay value 270 may also proportionally increase to further reduce the switching factor. Alternatively, the delay value 270 could be kept at a constant level or adjusted in any number of ways within the spirit and scope of the present invention. Those skilled in the art will also appreciate that the particular sampling rate can also be varied according to the needs of the particular architecture and could be at any rate, or even continuous.

As a result of the thermal feedback, the dispatch unit 114' will modulate the switching factor until the temperature of the overheating functional unit drops below the threshold temperature 230. The temperature decoder 130 subsequently selects the feedback path 125 associated with the previously overheating functional unit and the ring oscillator frequency of the associated sensor 119 is coupled to counter 210. The counter 210 translates the sampled frequency into a digital signal 220 representing the current operating temperature of the sampled functional unit. The control logic 200 simultaneously outputs the predetermined digital signal 230 representing the threshold temperature for the sampled functional unit. Both digital signals 220 and 230 are coupled to the comparator 240 which outputs an enable signal 250 to decoder 260 when the signal 220 exceeds threshold temperature 230. Here, the reduced switching factor has reduced the power dissipated so that digital signal 220 is now less than the threshold temperature 230. As a result, comparator 240 does not generate enable signal 250. Decoder 260 may then output a delay signal 270 representing a no-delay count to be sent to dispatch unit 114. Here, the delay signal could be any predetermined value, e.g., zero. The control logic 200 also outputs an associated functional unit address 280 for the sampled functional unit along with delay signal 270. The delay signal 270 representing the no-delay count and address 280 are coupled to dispatch unit 114 via the aforementioned data path 135. Referring again to FIG. 3, the functional unit address 280 is coupled to decoder 310 which decodes the address 280 and outputs the delay register enable signal 320 which loads delay value 270 representing the no-delay count into a delay register 330 associated with the overheating functional unit. The delay value 270 representing the no-delay count is then loaded into the counter 340. It is assumed that the loaded no-delay count equals the aforementioned predetermined value. The output of counter 340 is coupled to scheduler 117 which has been adapted to latch instructions contained instruction buffer 115 into reservation stations 118 as a function of the new temperature dependency according to the present invention represented by the delay value loaded into counter 340. In this case, the scheduler 117 will output load signal 350 to latch an instruction contained in instruction buffer 115 into reservation station 118 for an available (no other dependencies) functional unit since the predetermined value, e.g., a zero value, is loaded in the counter 340 associated therewith.

Those skilled in the art will appreciate that within the scope of the present invention, the multi-functional processor need not be incorporated on a single chip. For example, the processor could be a distributed parallel processor such as is sold by the IBM Corporation under the trademark "SP2". In this case, a scheduler managing the partitioning and allocation of a job in the parallel environment may reduce the dispatch of instructions to an overheating distributed parallel processor node in response to a message received from a thermal sensor incorporated on the overheating node.

In another embodiment according to the present invention, one can consider a scheduler allocating data for real-time processing on a number of parallel digital signal processors (DSPs), e.g. for an image recognition application. The scheduler uses thermal feedback to reduce the switching factor to one or more overheating DSP's. Assuming the DSPs are functional equivalents, the remaining processors may be allocated a greater percentage of the processing task. Again note that the present invention does not preclude an increase in the clock frequency, e.g., to the remaining processors to optimize overall system throughput. More importantly, even where the net result is a longer time to complete the task, the chip remains within the allowable temperature range.

Figure 4A:
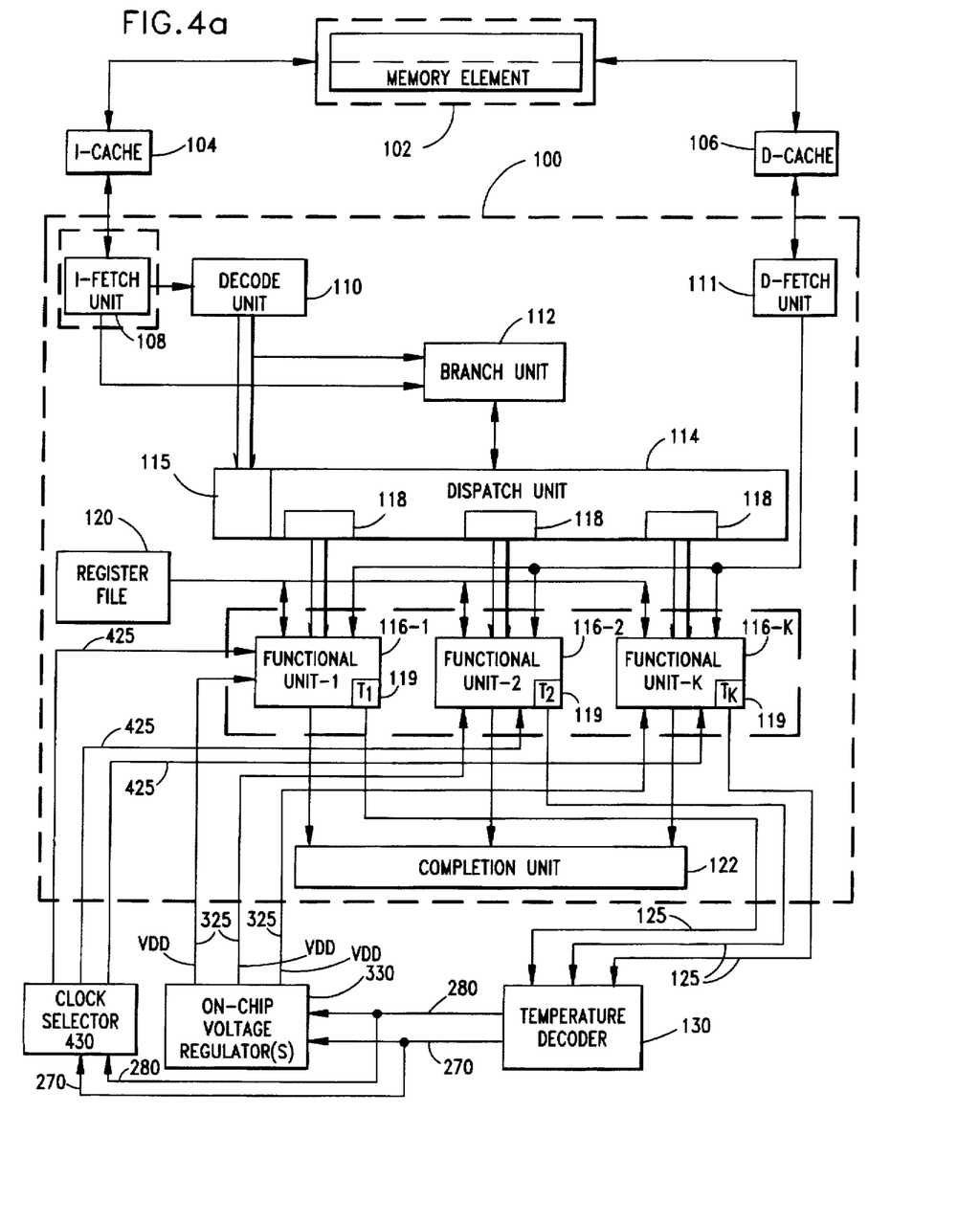
FIG. 4a shows schematically an overview of an alternative embodiment of the system of FIG. 1b for cooperatively varying the voltage and frequency of a circuit to control heating.
Figure 4B:
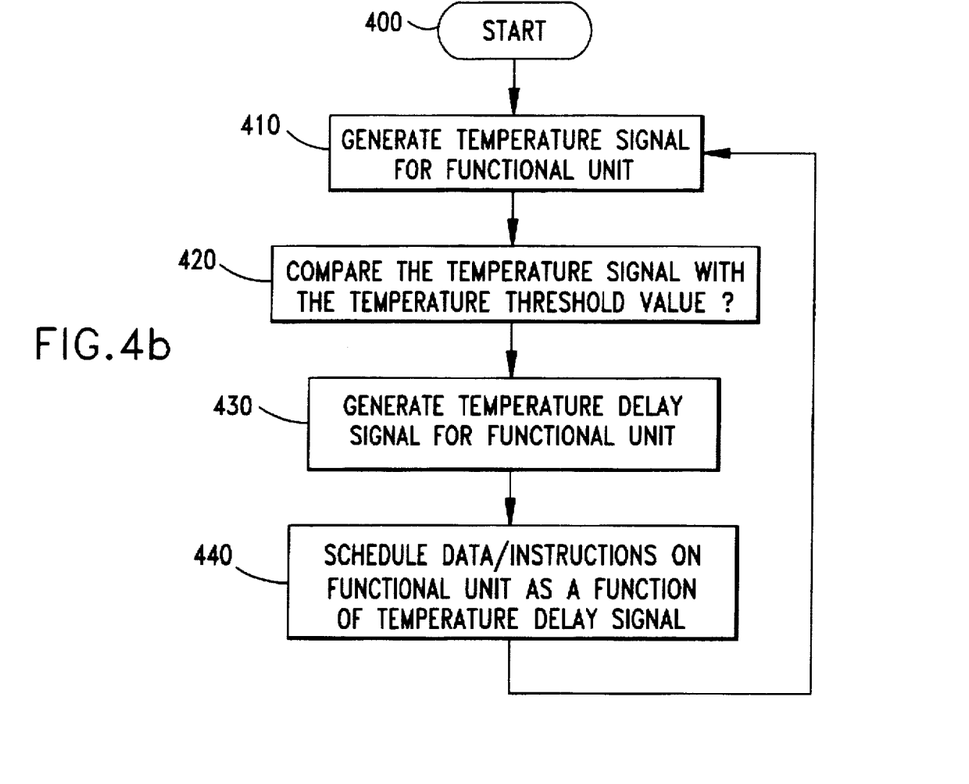
FIG. 4b shows a logic flow chart of a method in accordance with the system of the present invention.

FIG. 4b depicts a logic flowchart which illustrates a method for modulating the switching factor of a functional unit in accordance with the system of the present invention. As depicted, the process begins at step 400 and thereafter proceeds to step 410. In step 410, a thermal sensor 119 associated with a functional unit generates a signal 125 which is a function of a temperature at the functional unit. In step 420, the signal 125 is compared to a predetermined threshold and an enable signal 250 is generated according to the comparison. In step 430, Alternately, the signal could be compared to the signal generated during a prior sampling period or periods and control passed to step 430 upon a determination that the temperature is approaching the threshold. In step 430, the temperature decoder 130 generates a delay signal 135 to the dispatch unit 114 according the comparison of step 420. The delay signal 135 includes an address 280 of the relevant functional unit and a delay value 270 which represents a new dependency to be used by the dispatch unit 114' for modulating the circuit switching factor (S), or duty cycle, of the relevant functional unit. For example, if the current temperature 220 exceeds the threshold, an enable signal 250 can couple the delay value dependency signal to the dispatch unit 114.' If the signal 125 does not exceed (or approach) a threshold delay signal is generated such that the dispatch unit schedules the instruction for immediate execution on the appropriate functional unit, subject to any other dependencies. In step 440, the dispatch unit 114' examines the instructions for dependencies, including the new switching factor dependency, prior to scheduling the instructions for execution, one to each functional unit. The dispatch unit 114' detects the delay signal 135 and reduces the instruction dispatch rate (the switching factor) to the overheating functional unit according to the signal 135. As noted previously, incoming instructions can be scheduled on an available equivalent functional unit for processing without any reduction in throughput.

Next, the process iterates and the dispatch unit 114' continues to modulate the switching factor of the functional unit(s) based on the thermal feedback. If the functional unit which was previously overheating as indicated by step 430, cools to acceptable levels (the temperature delay signal no longer exceeds or approaches the threshold value) the dispatch unit may increase the rate at which instructions are scheduled (the switching factor) to the functional unit. Alternately, the functional unit could be maintained at the lower switching factor until the temperature signal was less than (or approached) a second predetermined threshold which represented a lower temperature than threshold temperature 230. Again, these features of the present invention efficiently and directly reduces the power dissipation for the fraction of cycles that the functional unit's inputs are addressed. Although, no direct modulation of the system or functional units clocks is required, such clock modulation may be used as a supplement to the present invention.

Additional steps can be taken, to advantageously use the thermal feedback to cooperatively vary the voltage and frequency of and thus the power dissipated by an overheating functional unit. CMOS and similar circuits will function correctly over a significant range of supply voltage. Reducing the applied voltage will reduce power dissipation in proportion to the voltage squared. Reducing the voltage, however, also tends to increase a signal's propagation delay and may cause synchronization and reliability problems. For example, a digital chip is typically characterized by a critical timing path. Reducing the supply voltage will cause the propagation of a signal through the critical timing path to slow until a malfunction occurs.

According to a version of the present invention, by using thermal sensors for feedback, the voltage swing and operating frequency of the circuit are cooperatively varied to reduce the power dissipation while maintaining critical timing paths within specifications. Thus, synchronization and reliability issues are avoided. An example of such a method and system can be seen in the aforementioned U.S. patent application entitled "Performance-Temperature Optimization by Cooperatively Varying the Voltage and Frequency of a Circuit," filed of even date herewith by the inventors hereof and assigned to the same assignee herein, and incorporated herein by reference in its entirety.

Figure 4C:
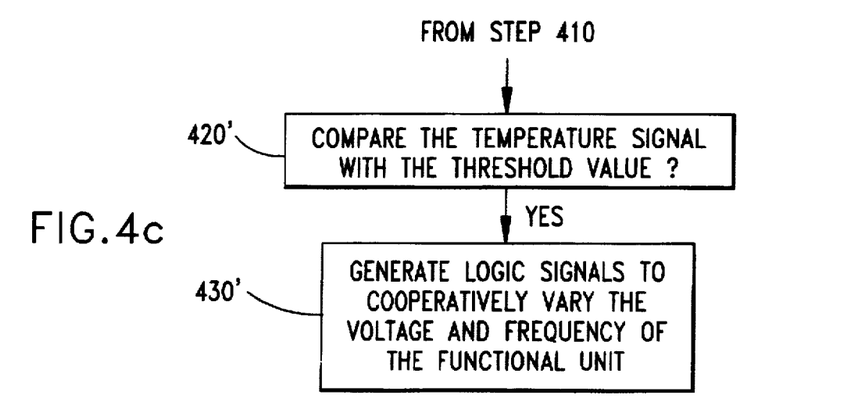

FIG. 4c depicts a logic flowchart which illustrates a modification of step 420 for cooperatively varying the voltage and frequency of a functional unit in accordance with the system shown in FIG. 4a. As depicted, the process begins at step 420'. In step 420', the signal 125 is compared with the temperature threshold and generates an enable signal to be used in step 430'. In step 430', a current/clock control signal is generated, as a function of the comparison, which may be used to cooperatively vary the voltage and frequency of the functional unit to a predetermined voltage-frequency pair which controls power dissipation while satisfying identified critical timing paths for the functional unit. For example, if the current temperature exceeds the threshold temperature, the voltage/frequency pair of the appropriate functional unit are reduced to control the power dissipated. Alternately, the temperature signal could be compared to the signal generated during a prior sampling period or periods and output a corresponding current/clock control signal as a function of the threshold and/or the relationship between the current and prior temperature signals. Examples are: if the temperature is increasing or decreasing and/or its proximity and/or prior relationship to the threshold and/or the current temperature is less than for a previous sampling. Thus, the modulated voltage-frequency are applied to the functional unit to dynamically control heating while maintaining synchronization and reliability.

In order to achieve the above advantages, the thermal sensors and the functional units should be design compatible with standard CMOS technology. The thermal sensors may provide either an analog or digital signal which correlates to the absolute temperature measured by the sensor.

While we have described our preferred embodiments of our invention, it will be understood that those skilled in the art, both now and in the future, may make various improvements and enhancements which fall within the scope of the appended claims. Accordingly, these claims should be construed to maintain the proper protection for the invention first disclosed.

We claim:

1. A method for varying a switching factor (S) of a clocked circuit operating at a frequency (f) and including one or more functional units adapted for performing one or more functions, said method comprising the steps of:
   generating a temperature signal which is a function of a temperature associated with the circuit;
   comparing the temperature signal with a predetermined temperature threshold signal; and
   varying the switching factor of a functional unit by varying processing of one of instructions and data on the functional unit, wherein the functional unit dissipates power at a fraction (1/S) of circuit clock cycles, responsive to said step of comparing.

2. A method as claimed in claim 1, further comprising the steps of generating a temperature delay signal, responsive to said comparing step, wherein said step of varying the switching factor comprises reducing the switching factor as a function of the temperature delay signal.

3. A method as claimed in claim 1, further comprising the steps of:
   generating a second temperature signal subsequent to the temperature signal; and
   comparing the second temperature signal with the predetermined temperature threshold signal; wherein said step of varying the switching factor is responsive to said step of comparing the second temperature signal.

4. A method as claimed in claim 1, in a data processing system with a plurality of circuits including a first functional unit and a second functional unit, further comprising the steps of:
   generating the temperature signal for each functional unit and identifying the one of the first and second functional unit associated with the temperature signal; and
   varying the switching factor of the first functional unit, responsive to said step of comparing.

5. A method as claimed in claim 4, further comprising the steps of scheduling one of an instruction and data for processing on the second functional unit, responsive to said step of vary the switching factor of the first functional unit.

6. A method as claimed 1 wherein said step of generating is done periodically.

7. A method as claimed in claim 1 further comprising the steps of:
   converting the temperature signal to a delay signal which includes a value, responsive to said step of generating; and wherein said step of varying the switching factor is a function of the value.

8. A method as claimed in claim 1, in a data processing system having a superscalar architecture including the one or more functional units, wherein said varying step further comprises the step of scheduling one of instructions and data stored in a memory for processing on the one or more functional units responsive to the temperature signal.

9. A method as claimed in claim 8 wherein the temperature signal is generated for the one or more functional units, said method comprising the steps of identifying the functional unit associated with the temperature signal; wherein said varying step comprises varying the switching factor of the functional unit responsive to said identifying step.

10. A method as claimed in claim 1 wherein the one or more functional units is selected from the group consisting of: a superscalar microprocessor; a fixed-point unit, a floating point unit, a load/store unit, and a branch unit found in general purpose and superscalar microprocessors; a closely-coupled parallel processor; a distributed parallel processor; a microcontroller; an MPEG decoder; and a digital signal processor.

11. A method as claimed in claim 1, further comprising the step of regulating the voltage to the circuit, responsive to said step of comparing.

12. A method as claimed in claim 11, wherein said step of regulating the voltage to the circuit, comprises the steps of
   generating logic signals to control current sources to an adjustable voltage regulator coupled to the circuit; and
   varying the voltage regulator output according to the logic signals.

13. A method as claimed in claim 1 wherein the functional unit is selected from the group consisting of: a superscalar microprocessor; a fixed-point unit, a floating point unit, a load/store unit, and a branch unit found in general purpose and superscalar microprocessors; a closely-coupled parallel processor; a microcontroller; an MPEG decoder.

14. A method of using thermal feedback to modulate the switching factor of a first functional unit and a second functional unit in a data processing system, the method comprising the steps of:
   scheduling instructions stored in a memory for execution on each functional unit;
   generating a first temperature signal for the first functional unit and a second temperature signal for the second functional unit, each temperature signal being a function of a temperature associated with said each functional unit;
   identifying the first functional unit and the second functional unit associated with said each temperature signal, responsive to said generating step;
   comparing the first temperature signal with a first predetermined temperature threshold signal;
   generating a first temperature delay signal, responsive to said comparing step;
   reducing a switching factor of the first functional unit to control heating as a function of the first temperature delay signal by delaying said step of scheduling instructions for execution on the first functional unit, wherein the switching factor is the fraction of clock cycles that each functional unit is dissipating power, and
   rescheduling said instructions for execution on the first functional unit on said second functional unit.

15. A method as claimed in claim 14, further comprising the step of regulating the voltage to the circuit, responsive to said step of comparing.

16. A method as claimed in claim 15, wherein said step of regulating the voltage to the circuit, comprises the step of generating logic signals to control current sources to an input of an adjustable voltage regulator having an output coupled to the circuit.

17. A method as claimed in claim 16, wherein said step of reducing further comprises the steps of scheduling one of instructions and data for processing on the second functional unit, responsive to the first functional unit generating the temperature delay signal.

18. A system for controlling a switching factor of a functional unit included in a data processing system to control heating, said system comprising:
   a temperature signal means for generating a temperature signal which is a function of a temperature associated with the functional unit; and
   a switching factor means for varying the switching factor of the functional unit, coupled to said temperature signal means, responsive to the temperature signal, wherein the switching factor is a fraction of clock cycles that the functional unit is dissipating power;

said switching factor means including scheduler means for scheduling one of an instruction and data for processing on the functional unit, responsive to said temperature signal means for generating the temperature signal.

19. A system as claimed in claim 18 wherein said switching factor means further comprises:

a comparator means for comparing the temperature signal with a predetermined temperature threshold signal;

a temperature delay signal means for generating a temperature delay signal when the temperature signal exceeds the predetermined threshold, the temperature delay signal having a magnitude representing an amount by which the temperature signal exceeds the predetermined threshold, responsive to said comparing step; and wherein said switching factor means includes means for reducing the switching factor as a function of the temperature delay signal.

20. A system as claimed in claim 19 wherein said temperature signal means includes means for generating a second temperature; and wherein said for switching factor means includes means for increasing the switching factor when a second temperature signal received subsequent to the temperature signal does not exceed the predetermined temperature threshold signal.

21. A system as claimed in claim 18, wherein the data processing system comprises a first functional unit and a second functional unit, and wherein said temperature signal means further comprises means for generating the temperature signal for each functional unit; and a functional unit identifier means, coupled to each functional unit and to said switching factor means, for identifying the one of the first and second functional unit associated with the temperature signal.

22. A system as claimed in claim 18 wherein said switching factor means further comprises:

a scheduler means for scheduling one of an instruction and data for processing on the functional unit, responsive to said temperature signal means for generating the temperature signal.

23. A system as claimed in claim 18 wherein said temperature signal means includes means for generating the temperature signal periodically.

24. A system as claimed in claim 18 further comprising:

a decoder means for converting the temperature signal to a delay signal having a value, responsive to said step of generating; and wherein said switching factor means is responsive to the value.

25. A system as claimed in claim 18, wherein the data processing system comprises a plurality of functional units, and wherein the scheduler means for scheduling one of instructions and data for processing on the functional units responsive to the temperature signal.

26. A system as claimed in claim 25 wherein said temperature signal means is coupled to each functional unit, said system comprising:

a functional unit identifier means, coupled to each functional unit and to said switching factor means, for identifying said each functional unit associated with the temperature signal; and wherein said switching factor means includes means for varying the switching factor of said each functional unit responsive to said functional unit identifier means.

27. A system as claimed in claim 25 wherein the data processing system includes a superscalar microprocessor.

28. A system as claimed in claim 25 wherein the data processing system includes a distributed parallel processor.

29. A system as claimed in claim 25 wherein the data processing system includes a digital signal processor.

30. A system as claimed in claim 18, wherein a thermal sensor is integral with the functional unit, and wherein the temperature signal is generated by the thermal sensor.

31. The system as claimed in claim 30 wherein the thermal sensor is a ring oscillator.

32. A system for controlling the switching factor of a data processing system including a first functional unit and a second functional unit, comprising:

a scheduler means, coupled to each functional unit, for scheduling one of instructions and data for processing on said each functional unit;

a temperature signal means, coupled to each functional unit and to the scheduler means, for generating a first temperature signal which is a function of a temperature associated with the first functional unit and a second temperature signal which is a function of a temperature associated with the second functional unit;

functional unit identifier means, coupled to the temperature signal means and to the scheduler means, for identifying the first functional unit and the second functional unit associated with said each temperature signal, responsive to said generating step;

a comparator means, coupled to the temperature signal means, for comparing the first temperature signal with a first predetermined temperature threshold signal, and for generating a first temperature delay signal when the first temperature signal exceeds the first predetermined threshold, responsive to the comparator means; and said scheduler means including a switching factor means for reducing the switching factor of the first functional unit as a function of the first temperature delay signal by delaying said scheduling one of instructions and data for processing on said each functional unit, wherein the switching factor is the fraction of clock cycles that the functional unit is dissipating power.

33. A system as claimed in claim 32, wherein said scheduler means further comprises means for scheduling one of said instructions and data for processing on the second functional unit, responsive to the first functional unit generating the temperature delay signal.

* * * * *